(12) United States Patent
Lee (10) Patent No.: US 8,761,346 B2
(45) Date of Patent: Jun. 24, 2014

(54) MULTILAYER TOTAL INTERNAL REFLECTION OPTIC DEVICES AND METHODS OF MAKING AND USING THE SAME

(75) Inventor: Susanne Madeline Lee, Cohoes, NY (US)

(73) Assignee: General Electric Company, Niskayuna, NY (US)

( * ) Notice: Subject to any disclaimer, the term of this patent is extended or adjusted under 35 U.S.C. 154(b) by 404 days.

(21) Appl. No.: 13/194,346

(22) Filed: Jul. 29, 2011

(65) Prior Publication Data
US 2013/0028387 A1   Jan. 31, 2013

(51) Int. Cl.
*G21K 1/06*    (2006.01)
*G21K 3/00*    (2006.01)

(52) U.S. Cl.
USPC ........................................ 378/145; 378/156

(58) Field of Classification Search
USPC ......... 378/145, 147, 149, 156, 158, 204, 210; 356/432–448
See application file for complete search history.

(56) References Cited

U.S. PATENT DOCUMENTS

| | | | | |
|---|---|---|---|---|
| 4,958,363 | A * | 9/1990 | Nelson et al. .............. | 378/85 |
| 5,192,869 | A | 3/1993 | Kumakhov | |
| 5,604,353 | A | 2/1997 | Gibson et al. | |
| 6,934,359 | B2 | 8/2005 | Chen et al. | |
| 6,935,778 | B2 | 8/2005 | Bievenue et al. | |
| 7,366,374 | B1 | 4/2008 | Lee et al. | |
| 7,412,131 | B2 | 8/2008 | Lee et al. | |
| 7,508,911 | B1 | 3/2009 | Lee et al. | |
| 8,311,184 | B2 * | 11/2012 | Lee et al. .............. | 378/84 |
| 2005/0094271 | A1 | 5/2005 | Hoghoj | |
| 2005/0117239 | A1 | 6/2005 | Hoghoj et al. | |
| 2006/0018429 | A1 | 1/2006 | Hoghoj et al. | |
| 2006/0062351 | A1 | 3/2006 | Yokhin et al. | |
| 2009/0041198 | A1 | 2/2009 | Price et al. | |
| 2009/0074146 | A1 | 3/2009 | Lee et al. | |
| 2009/0127096 | A1 * | 5/2009 | Huang et al. .............. | 204/192.11 |
| 2009/0147922 | A1 | 6/2009 | Hopkins et al. | |
| 2010/0296171 | A1 * | 11/2010 | Lee et al. .............. | 359/652 |
| 2012/0163547 | A1 * | 6/2012 | Lee et al. .............. | 378/120 |

FOREIGN PATENT DOCUMENTS

WO   2009076111 A2   6/2009

OTHER PUBLICATIONS

Tournear et al., "Gamma-Ray Channeling in Layered Structures", IEEE, pp. 4282-4285, 2004.
E.Difabrizio et al; "Shaping X-rays by diffractive coded nano-optics"; vol. 67-68 , Issue 1 (Jun. 2003); ISSN:0167-9317; ISSN:0167-9317; 2 Pages.
Enzo M. Di Fabrizio; Dan Cojoc; Stefano Cabrini; Burkhard Kaulich; Thomas Wilhein and Jean Susini; "Novel diffractive optics for x-ray beam shaping"; DOI: 10.1117/12.452287; Date: Nov. 21, 2002; 2Pages.

* cited by examiner

*Primary Examiner* — Anastasia Midkiff
(74) *Attorney, Agent, or Firm* — Jenifer Haeckl (57) ABSTRACT

A multilayer optic device having an input face and an output face is provided. The optic device includes a high-index material layer having a first real refractive index $1-\delta_1$ and a first absorption coefficient $\beta_1$, wherein the core comprises a first surface and a second surface, a low-index material layer having a second real refractive index $1-\delta_2$ and a second absorption coefficient $\beta_2$, and a grading zone disposed between the high-index material layer and low-index material layer, the grading zone comprising a grading layer having a third real refractive index $1-\delta_3$ and a third absorption coefficient $\beta_3$, such that $1-\delta_1>1-\delta_3>1-\delta_2$, where at least a portion of one or more of the high-index material layer, the grading zone and the low-index layer comprises one or more corrugations along a first direction.

23 Claims, 8 Drawing Sheets

FIG. 12

MULTILAYER TOTAL INTERNAL REFLECTION OPTIC DEVICES AND METHODS OF MAKING AND USING THE SAME

BACKGROUND

The invention relates generally to optics, and more particularly to multilayer optic devices and methods of making the same.

In X-ray based imaging and analysis applications, such as but not limited to computed tomography (CT) or X-ray diffraction, conventional X-ray sources generate a sufficient amount of X rays for imaging and analysis; however, more than 99% of the generated X rays travel in directions where these X rays are not utilized for the intended purpose. The unused X rays are absorbed by the source housing or primary X-ray beam collimator. Due to a large portion of generated X rays not being utilized for the intended purpose, existing X-ray imaging and analysis applications suffer from insufficiently low X-ray flux at the patient or sample being imaged or analyzed.

Currently, commercially-available optic devices capture and redirect typically 1% or less of the unused X rays from the source in desirable directions. Hence, these X rays remain unused even after employing commercially-available optic devices in the X-ray system. Prior and currently available approaches for increasing the X-ray flux on the patient or sample rely on increasing the number of X-rays generated in the source. The X-ray flux is typically increased by increasing the electron beam density impacting a target. Although this approach provides enhanced flux values, there is a physical limit to maximum number that can be produced this way that is imposed by the target materials. For example, when electrons impact the target and create X rays, if the heat generated is not dissipated quickly enough, the target will evaporate or melt. Moreover, by using this approach of increased electron beam density, the X-ray flux may be increased only by about 50 percent over current state of the art before target integrity is compromised.

In applications such as medical CT or X-ray diffraction (e.g., baggage scanning for explosives detection), the X-ray beam shape is not circularly symmetric. In such cases, the X-ray flux on a patient or sample may be increased by using multilayer total internal reflection (TIR) optics to redirect some of the "unused" X rays into one of the useful directions, such as a cone direction of the X-ray beam. Such collection and redirection of the X-ray beam in one direction is referred to as a one-dimensional compression and can result in intensity gains of more than several hundred times over the gains achieved by other optic devices. In several instances, for example cardiac CT imaging for reducing cardiac motion effects or fast baggage scanning using X-ray diffraction, it may be desirable to have even higher intensity X-ray fluxes.

It would thus be desirable to provide an optic device that can collect and redirect X rays in directions other than the cone direction and increase the intensity of the X-ray flux on the patient or the object.

BRIEF DESCRIPTION

In one embodiment, a multilayer optic device having an input face and an output face is provided. The optic device includes a high-index material layer having a first real refractive index $1-\delta_1$ and a first absorption coefficient $\beta_1$, wherein the core comprises a first surface and a second surface, a low-index material layer having a second real refractive index $1-\delta_2$ and a second absorption coefficient $\beta_2$, and a grading zone disposed between the high-index material layer and low-index material layer, the grading zone comprising a grading layer having a third real refractive index $1-\delta_3$ and a third absorption coefficient $\beta_3$, such that $1-\delta_1 > 1-\delta_3 > 1-\delta_2$, where at least a portion of one or more of the high-index material layer, the grading zone and the low-index layer comprises one or more corrugations along a first direction.

In another embodiment, a method of making an optic device is provided. The method includes providing a first multilayer section having a high-index layer, a grading zone and low-index layer conformally disposed, wherein the high-index layer, the grading zone and the low-index layer comprises one or more corrugations along a first axis, and wherein at least one corrugation is curved along a second axis, providing a second multilayer section having a high-index layer, a grading zone and low-index layer conformally disposed, wherein the high-index layer, the grading zone and the low-index layer comprises one or more corrugations along the first axis, and wherein at least one corrugation is curved along the second axis, and disposing the first multilayer section on the second multilayer section such that the high-index layer of the first and the high-index layer of the second multilayer sections are disposed adjacent each other.

In yet another embodiment, a method of making an optic device is provided. The method includes providing a multilayer optic device. The multilayer optic device comprising a high-index material layer having a first real refractive index $1-\delta_1$ and a first absorption coefficient $\beta_1$, wherein the core comprises a first surface and a second surface, a low-index material layer having a second real refractive index $1-_2$ and a second absorption coefficient $\beta_2$, and a grading zone disposed between the high-index material layer and low-index material layer, the grading zone comprising a grading layer having a third real refractive index $1-_3$ and a third absorption coefficient $\beta_3$, such that $1-\delta_1 > 1-\delta_3 > 1-\delta_2$, where at least a portion of one or more of the high-index material layer, the grading zone and the low-index layer comprises one or more corrugations along a first direction. The method further includes removing at least a portion of the low-index layer, and at least a portion of the grading zone along a plane to form grooves in the multilayers, and depositing a material in the grooves to form the corrugations.

DETAILED DESCRIPTION

Embodiments of the invention describe a multilayer total internal reflection (TIR) optic device suitable for collecting and redirecting incident X rays in more than one direction. In certain embodiments, the multilayer optic device may be configured to redirect the incident X rays in two directions. In one example, as described in detail with regard to FIGS. 1-4, the multilayer optic device may be configured to redirect the incident X rays in a cone direction and a fan-beam direction. In this example, the amount of X-ray flux collected in the fan direction of the X-ray beam, in addition to the X-ray flux collected in the cone direction, results in increased X-ray flux on the patient or the object.

In certain embodiments, the TIR multilayer optic device includes an input face and output face. The input face of the optic device may be defined as the face of the optic device that is closest to the radiation source. The X-rays produced by the target enter the optic device through the input face. The output face may be defined as the face through which the redirected X-ray beams exit the optic device. The optic device includes a high-index material layer, a low-index material layer and a grading zone disposed between the high-index material layer and the low-index material layer. At least a portion of one or more of the high-index material layer, the grading zone and the low-index layer includes one or more corrugations along a first direction. In one embodiment, at least one of the corrugations may be curved along a second direction. The second direction may be about perpendicular to the first direction. The second direction may be a fan-beam direction, and perpendicular to the first direction and a direction of the cone of the X-ray beam exiting the output face of the optic device. The corrugations may be curved outward with respect to a central axis of the optic device. The curvature of the curved corrugations may be decided based upon X-ray energy levels, size of the optic device, distance between the optic device and an X-ray source.

As used herein, the term "first direction" refers to a direction along the input face of the optic device. Although directional orientation is relative, as is the convention employed by those skilled in the art and used herein, the term, "fan-beam direction" refers to a horizontal direction. As described below with regard to FIG. 1, the fan-beam direction is a direction parallel to a direction generally represented by reference numeral 26 of FIG. 1. As used herein, the term "cone direction" refers to a direction perpendicular to the fan-beam direction. As described below with regard to FIG. 1, the fan-beam direction is a vertical direction that is parallel to a direction generally represented by reference numeral direction 30 in FIG. 1.

In some embodiments, the multilayer optic device may include alternating lower and higher refractive index materials with concurrent high and low X-ray absorption properties, respectively, in contiguous layers. By using the alternating lower and higher refractive index materials with concurrent high and low X-ray absorption properties, respectively, in contiguous layers, the multilayer optic device can utilize the principle of total internal reflection of electromagnetic radiation.

In one embodiment, at least a portion of the high-index material layer may form a core. The core may be formed of a higher index of refraction material such as beryllium, lithium hydride, magnesium, or any other suitable elements or compounds having similarly higher refractive indices and high X-ray transmission properties. The core may be less than a micrometer to greater than one centimeter in diameter. The core may include a first surface and a second surface. Layers of the multilayer optic device may be disposed on the first and second surface of the core. The layers may be disposed radially exterior to the core.

In other embodiments, a minimum of three different materials including a high-index material layer, a grading zone and a low-index material layer, are used in a multilayer section to obtain increased total internal reflection by maximizing the difference in real refractive indices between successive layers, with the real refractive index decreasing in successive layers traversing from the high-index material layer to the low-index layer. In an embodiment that provides even greater total internal reflection, the ratio of the change in imaginary parts to the change in real refractive index between successive layers is minimized by simultaneously minimizing the change in the imaginary part and maximizing the change in the real refractive index between successive layers. The imaginary part of the refractive index is related to the mass-energy absorption coefficient of the material in which the X rays are traveling. Additionally, each successive layer has higher X-ray mass-energy absorption properties, while the real refractive index decreases monotonically from layer to layer. These criteria provide for relatively optimal changes in real refractive index and X-ray absorption properties than in current materials used for X-ray optics that redirect X rays by total internal reflection. In one embodiment, the multilayers in the grading zone are arranged according to refractive indices such that the real parts of the refractive indices of the materials of the multilayer are graded generally from a high value to a low value within the grading zone. For improved reflectivity, X-ray absorption differences also are generally minimized between adjacent multilayer materials. For the purpose of this disclosure, a first layer is considered adjacent to a second layer when there are no other materials interposed between the first and second layers that have a real refractive index or a coefficient of absorption that are different from the respective real refractive indices or coefficients of absorption of the first and second layers.

Generally, the complex refractive index 'n' of a material at X-ray energies can be expressed as $n=1-\delta+i\beta$, where the term $(1-\delta)$ is the real part of the complex refractive index of the material and the parameter $\beta$ is the imaginary part of the complex refractive index and is related to the mass-energy absorption coefficient in the material. At X-ray energies, the real part of the refractive index is very close to unity and is therefore usually expressed in terms of its decrement $\delta$ from unity, with $\delta$ typically on the order of $10^{-6}$ or smaller.

The high-index material layer may be made of a high-index material having a first complex refractive index $n_1$ with a real part Re $(n_1)$ and an imaginary part $\beta_1$. The real part Re$(n_1)$ of the first complex refractive index may also be represented as $(1-\delta_1)$. A low-index material layer having a second complex refractive index $n_2$ having a real part Re $(n_2)$ and an imaginary part $\delta_2$. The real part Re$(n_2)$ of the second complex refractive index may also be represented as $(1-\delta_2)$. A grading zone may be disposed between the high-index material layer and low-index material layer. The grading zone may include a plurality of grading layers. The grading layers may have a third complex real refractive index $n_3$ having a real part Re ($n_3$) and an imaginary part $\beta_3$ such that Re($n_1$)>Re($n_3$)>Re($n_2$). The real part Re($n_3$) of the third complex refractive index may also be represented as ($1-\delta_3$). As used herein, the term "imaginary part of the complex refractive index" corresponds to the mass-energy absorption coefficient.

For improved reflectivity, in one embodiment, the ratio of the change in $\beta$ to the change in $\delta$ between adjacent multilayer materials is generally minimized. For the purpose of this disclosure, a first layer is considered adjacent to a second layer when there are no other materials interposed between the first and second layers that have a real refractive index or a coefficient of absorption that are different from the respective real refractive indices or coefficients of absorption of the first and second layers. The multilayer optic may be adapted for use in redirecting an incident X-ray beam through total internal reflection as a reflected X-ray beam. The optic device may be configured to produce circularly symmetric beams, or a stack of fan-shaped beams. The multilayer stack may comprise a plurality of multilayer zones. The multilayer optic device may be made by employing the techniques disclosed in the commonly assigned application titled "OPTIMIZING TOTAL INTERNAL REFLECTION MULTILAYER OPTICS THROUGH MATERIAL SELECTION" having application Ser. No. 12/469,121.

In certain embodiments, the individual layers of the multilayer optic device may be conformally disposed on one another. The conformation of the corrugated layers enables the multilayer optic device to be utilized in a vacuum environment. The multilayer optic device may be employed in applications that require the optic device to operate at energy levels above 60 keV, such as but not limited to, medical imaging, explosive detection, industrial X-ray, and cargo inspection using X-ray diffraction. In one embodiment, the multilayer TIR optic device may operate at energy levels of about 450 keV.

A plurality of TIR optic devices may be stacked to collect a majority of the available X rays (e.g., about 2 percent to about 40 percent) from the target. In one embodiment, such a stack of optic devices may produce a set of parallel fan beams in a direction perpendicular to the plane of the fan. In another embodiment, the multilayer optic device may be circularly symmetric to generate a highly collimated beam in each spatial direction. The number of multilayer zones comprising the multilayer material stack is not limited in any way but is rather a function of the particular application for which the multilayer material stack is configured. The multilayer material stack may comprise tens or thousands of multilayer sections. For example, in the case of high-resolution industrial computed tomography (CT) where the resolution is on the order of micrometers, the number of multilayers in the stack may be less than ten layers. In other types of CT, where large optic collection angles are desired, the number of layers may be in the thousands. In addition to a high-index layer, a low-index layer, and a grading zone with one or more grading layers disposed between the high-index layer and the low-index layer, the multilayer optic device may also comprise an X-ray opaque cladding layer at the outermost surface of the optic device to prevent the emission of X-ray radiation from the interior of the optic device through the edges of the non-emitting face of the device. The X-ray opaque cladding layer may be disposed on the optic device such that X-rays enter the optic device through the input face and exit the optic device substantially through the optic output face.

In one embodiment, at least a portion of one or more of the high-index material layers, the grading zone and the low-index layer may include one or more non-corrugation portions along a first direction. The corrugation and the non-corrugation portions may be disposed alternately to form a layer of the optic device. The non-corrugation portions may be relatively free of corrugations. In one embodiment, at least one corrugation and a non-corrugation section of a layer of the optic device may be made of the same material. In another embodiment, the corrugation and the non-corrugation portions may be made of different materials. In this embodiment, the corrugation may include a high refractive index material. The high refractive index material may be same as the high refractive index material used in the high-index material layers of the optic device. Hence, in some layers of the optic device, the corrugation and non-corrugation portions may have the same material, while in the other layers, the corrugation and non-corrugation portions may have different materials. For example, for high-index material layers, the corrugation and non-corrugation portions may have the same material, while for the low-index material layer the corrugations and non-corrugation portions may have different materials with the corrugations having a high refractive index material and the non-corrugations having a low refractive index material In one embodiment, the high refractive index material of the corrugations may have relatively higher refractive index compared to the high refractive index material of the high-index material layers of the optic device. Typically, high refractive index materials transmit X rays with minimal losses. The higher refractive index material may be used to modify the properties of the output beam by providing a low-loss path for transmission of the X-ray beams through the higher refractive index corrugations. The different corrugations within a layer of the optic device may have the same or different materials. In one embodiment, the material of the corrugations may be used to block X-ray beams from outputting from certain portions of the optic device. In this embodiment, the corrugations which are configured to block the X-ray beams may be made of low refractive index material. The length of the portions of the multilayers of the optic device in which the corrugations are present may be decided based upon the desired X-ray flux, or intensity.

The composition of materials making up the multilayer optic device, the macroscopic geometry of the multilayer optic device, the thickness of the multilayer optic device, the curvature of the corrugations, and the number of individual layers determine the angular acceptance ranges of the multilayer optic device. The maximum solid angular acceptance range may be from about 0 steradians up to about $2\pi$ steradians of a solid angle of a source of the photons. For example, the curved corrugations in the fan-beam direction enable the optic device to collect X rays from a much wider incident fan beam than the existing optics. The curved corrugations also enable compression of an input X-ray fan beam to produce a compressed fan beam. In some embodiments, the fan beam may be compressed to an extent such that the output beam does not diverge. In these embodiments, the output beam may be parallel or converging.

In one embodiment, the corrugated multilayers may act as X-ray reflecting coatings that facilitate collection and redirection of X rays by satisfying the total internal reflection condition along the corrugations. Shaping the layers with the appropriate curvature and fabricating them with the appropriate thicknesses produces output X-ray beams having desired properties.

The optic device may have an exterior surface sloping between an input and an output face. In certain embodiments, each layer at the optic input (side closest to the source) may be curved at the same or different radius of curvature enabling the combined layers in the optic device to capture a large source solid angle. The various layers of the optic device may be curved or sloped in a cone direction as described in detail in the commonly assigned application titled "Multilayer optic device and system and method for making same" having U.S. Pat. No. 7,412,131, to provide redirection regions. In addition to a redirection region of the core and other multilayers in the cone direction, another redirection region is provided by curving the one or more corrugations in a second direction, such as the fan-beam direction. In these embodiments, the ridges of the corrugated layers may be curved in the fan-beam direction. In certain embodiments, curving the grooves in a particular direction enables the optic device to collect X rays from a much wider angle than is currently used and redirects the extra X rays in useful imaging directions. The multilayer optic devices having layers that are curved in the cone direction collect source X rays from a large cone angle and redirects the X rays into useful imaging directions in the cone portion of the beam. Similarly, the curved corrugations in the fan beam direction collect source X rays from a large fan beam and redirect the X rays into useful imaging directions in the fan beam direction. The curved corrugations enable the X rays in the fan beam direction entering the input face to be redirected to form a relatively less divergent (more focused) fan beam, thereby increasing the X-ray flux density at the output face. Depending upon the number of layers in the multilayer optic, there may be an X-ray density gain of 100 keV X rays of as much as 5000 times in the electromagnetic radiation output from the multilayer optic device over the output of conventional pinhole collimators. These two curvatures in the fan-beam and cone directions therefore collect and redirect X rays from the input X-ray beam resulting in maximal two-dimensional source-beam compression by the optic device. Such compression of the X-ray beam provides one of the highest possible X-ray flux gain from TIR multilayer X-ray optic devices.

Suitably shaping the input face of the optic device and selecting suitable materials within the optic device may eliminate undesired energy levels from the output X-ray beam and provide an output X-ray beam having desired spectral properties. In one example, a monochromatic X-ray beam may be produced by shaping the input face (curving or sloping the layers of the optic device at the input face of the optic device) and selecting suitable materials for the layers of the optic device to prevent transmission of undesired low or high energy X rays, respectively, through the optic. Further, the undesired energy regions may be minimized or eliminated using the total internal reflection within the optic device. In another example, a polychromatic X-ray beam may be produced by proper selection of material for the layers of the optic device. As described in detail with regard to FIGS. 6-7, in one embodiment, a filtering region may be disposed on the input face of the optic device. In one example, the filtering region may be configured to filter out low-energy X rays from the incident X rays.

Figure 1:
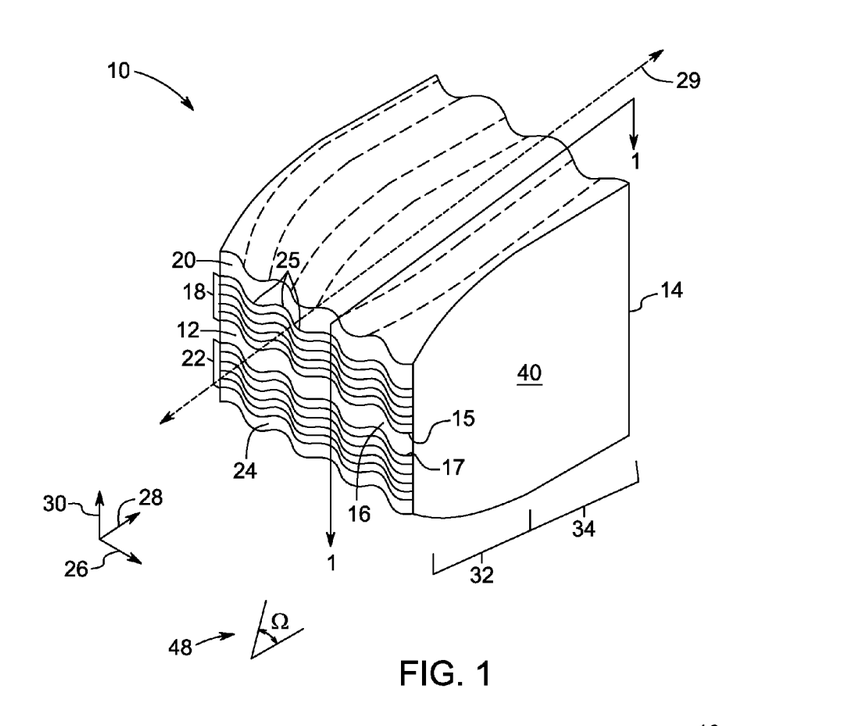
FIG. 1 is a perspective view of a multilayer optic device having continuous corrugations, a plurality of these corrugations being curved in a fan-beam direction, in accordance with embodiments of the present technique.
Figure 2:
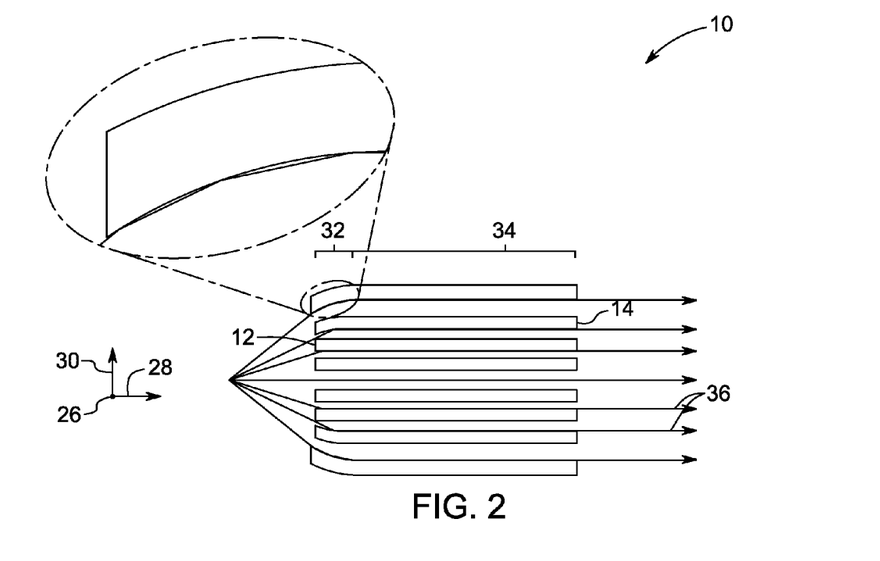
FIG. 2 is a cross-sectional view of the multilayer optic device of FIG. 1 cut along a 1-1 direction having redirection and transmission regions.

FIGS. 1 and 2 illustrate an example of a multilayer optic device 10. For ease of illustration, only a few layers have been illustrated with reference to the illustrated multilayer optic devices of various figures. However, it should be appreciated that any number of layers, including into the hundreds, thousands, or millions of layers, can be fabricated to utilize total internal reflection principles to form desirable beam shapes.

In the illustrated embodiment, the optic device 10 includes an input face 12 and an output face 14. The optic device 10 includes a core 16 that is a high-index material layer. The core 16 has a first surface 15 and a second surface 17. A grading zone 18 is disposed on the first surface 15 of the optic device 10. A low-index material layer 20 is disposed on the grading zone 18. A grading zone 22 is disposed on the second surface 17 of the optic device 10. A low-index material layer 24 is disposed on the grading zone 22. The layers disposed on the two surfaces 15 and 17 may or may not have same composition. For example, the grading zone 18 may have a different composition of grading layers than the grading zone 22. The grading zones 18 and 22, and the low-index material layers 20 and 24 are positioned exterior to and contiguous with the core 16. The core 16 may be formed of a high refractive index material such as beryllium, lithium hydride, magnesium, or any other suitable elements or compounds having similarly high refractive indices and high X-ray transmission properties. The core 16 may be less than a micrometer to greater than one centimeter in diameter. At least a portion of the core 16 may have corrugations 25 in a first direction represented by the reference numeral 26.

The corrugations 25 may be curved in a second direction represented by the reference numeral 28. The second direction 28 may be the direction in which the X-rays exit the optic device in a fan-beam shape. The curved corrugations 25 facilitate additional X-ray collection and redirection of the X rays in the fan-beam direction 26 of the beam. The corrugations 25 may be curved outwardly in the second direction with respect to a central axis 29 of the optic device 10.

The multilayers of the optic device 10 are curved in a cone direction 30 to define a redirection region 32 and a transmission region 34. The redirection section 32 functions to substantially collimate and redirect an incident divergent X-ray beam 48 as a substantially collimated beam to a desired region of space via the transmission section 34, which provides further collimation.

In one example, an X-ray beamlet may undergo hundreds or thousands of reflections along a curved surface of a corresponding multilayer in the redirection section 32 before passing out of the optic device through the output face 14. As will be appreciated, the desired trajectories of the collimated X-ray beamlets 36 (FIG. 2) are achieved when the reflected beamlets pass from the redirection section 32 into the transmission section 34, that is, when the tangent to the curved portion of a layer is substantially parallel to the continuing linear portion. The physical length of the transmission section 34 may be largely arbitrary and can be specified so as to provide a convenient physical size for handling or integrating the optic device 10 into a source subsystem. The design shown allows diverging electromagnetic radiation to be input into the input face 12, and redirected by the multilayers, and output from the output face 14 into a stack of parallel fan beams. Depending upon where the output face 14 is located relative to the photon redirection regions, the shape of the curved corrugations, and the position of the corrugations in the multilayers, the fan beams may be parallel or near parallel or may be somewhat divergent but still concentrated relative to the input of electromagnetic radiation.

In conventional medical and industrial CT applications, the X-ray beam shape is formed as a cone of X rays in a direction substantially perpendicular to the X-ray travel direction (represented by reference numeral 30) and a fan beam shape in the plane formed by directions 26 and 28. The fan beam direction is perpendicular to the central symmetry axis of the fan beam and in FIGS. 1 and 2 is shown by direction 26. X rays entering the optic device follow a three-dimensional path. In optic devices, X-rays in the cone beam direction are compressed, and the X-rays in the fan-beam direction 26 are not compressed by the optic device. By redirecting X rays from beyond the boundaries of a standard fan beam used in the CT imaging to within the fan-beam boundaries, the X-ray beam intensity may be increased. The curvature in the optic device 10 along the cone direction 30 and the fan beam direction 26 (curved corrugations) collect and redirect X rays from the input X-ray beam in two directions. This results in two-dimensional source-beam compression by the optic device. Such compression of the X-ray beam provides higher X-ray flux gain from the optic device than with compression in only one direction.

Figure 3:
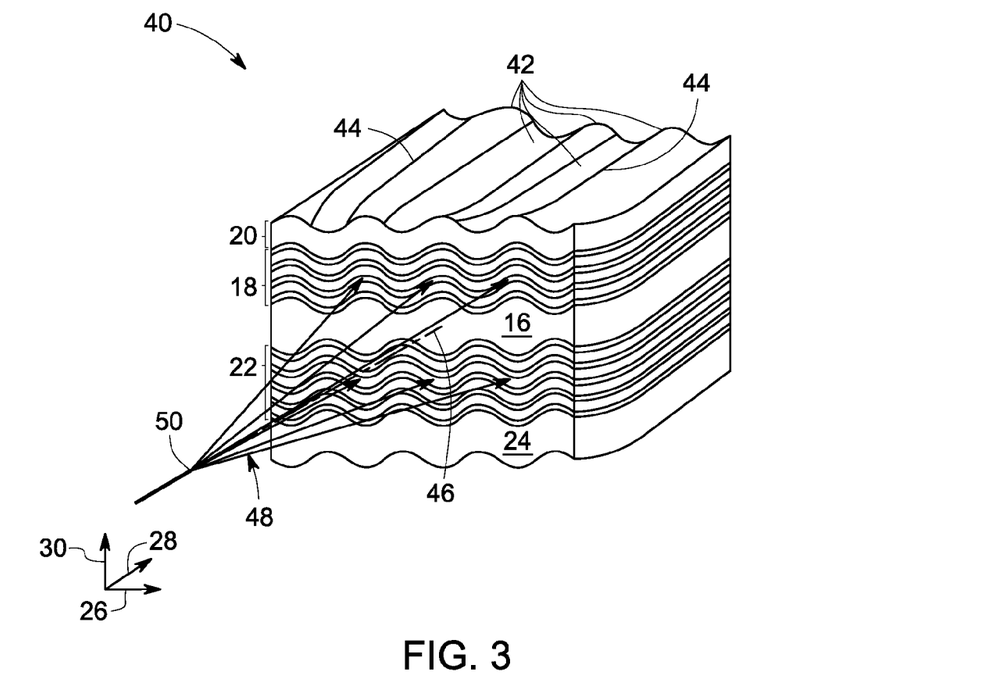
FIG. 3 is an enhanced perspective view of a portion of the cross-sectional view of the multilayer optic device of FIG. 1 illustrating details of the curved multilayers in a first direction and a fan-beam direction.

FIG. 3 is an enlarged perspective view of a portion 40 of the optic device 10 of FIG. 1. The curved-line portions 42 of the corrugations in the first direction 26 represent physical surfaces of positive and negative curvature such as, for example, grooves and ridges. One or more corrugations have ridges with curved shapes. The curved ridges are concave looking from a central axis or optic axis 46 of the optic device 10.

A divergent photon beam 48 may be provided by a photon source 50 to irradiate an input face of the multilayer optic device 10. The photon beam 48 is physically a continuous beam distributed over a specified solid angle (Ω) of emission, and the representation of the photon beam 48 as discrete beamlets is made only to facilitate the presentation of the various exemplary embodiments herein.

Figure 4:
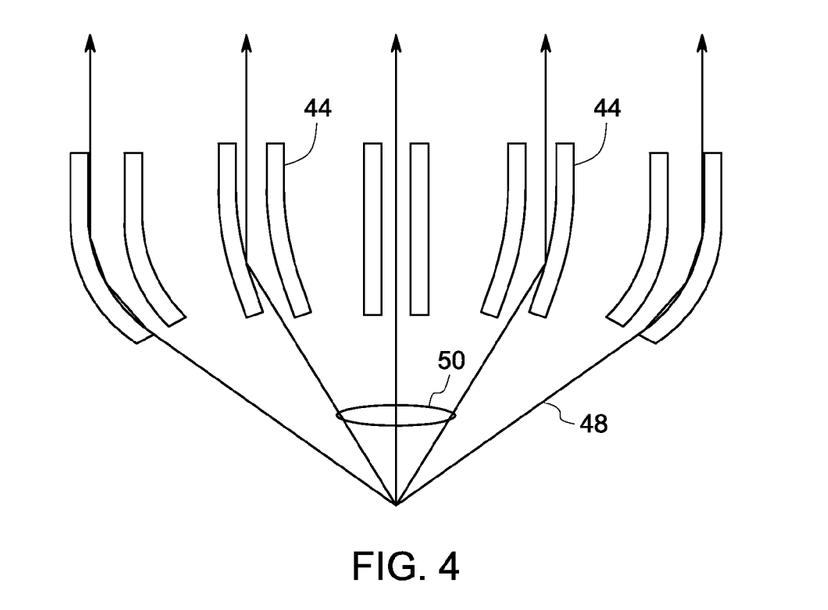
FIG. 4 is a top view of the multilayer optic device of FIG. 1 showing the redirected X-ray beam path in a fan direction.

FIG. 4 illustrates a top view of FIG. 3. In the illustrated embodiment, compression of the incident beam 48 in the fan-beam direction is illustrated. The outwardly curved corrugations 44 facilitate compression of the incident beam 48 in the fan beam direction 26.

Figure 5:
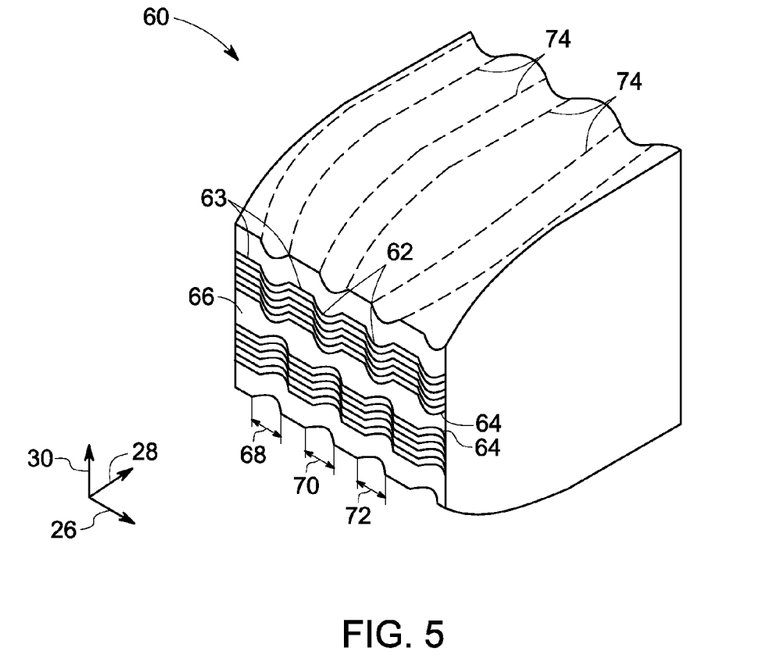
FIG. 5 is a perspective view of a multilayer optic device having corrugations in portions of multilayers, where the corrugations are curved in the fan beam direction.

FIG. 5 illustrates a multilayer optic device 60 having an input face 66. Further, the multilayer optic device includes corrugations 62 in determined portions of the multilayers of the optic device 60. The corrugations 62 and non-corrugation sections 63 may be adjacently disposed to form a layer of the multilayer optic device. Although shown as disposed in three discrete portions 68, 70 and 72, the corrugations 62 may be disposed in less or more number of portions in the optic device 60. As illustrated by dotted lines 74, the corrugations 62 are curved in the fan direction 26 to re-direct the beams in the fan direction. As described in detail below with regard to FIG. 12, an existing optic device like the ones described in U.S. Pat. No. 7,412,131 may be modified to form the optic device 60.

It should be appreciated, however, that only some of the multilayers may include corrugations. In some embodiments, a multilayer optic device may be coated with a TIR reflecting multilayer on the fan edges of the optic. In other embodiments, as described in detail with regard to FIGS. 5 and 12 the corrugations may be formed in one or more multilayers of an optic device, the corrugations may be coated with one or more materials.

Figure 6:
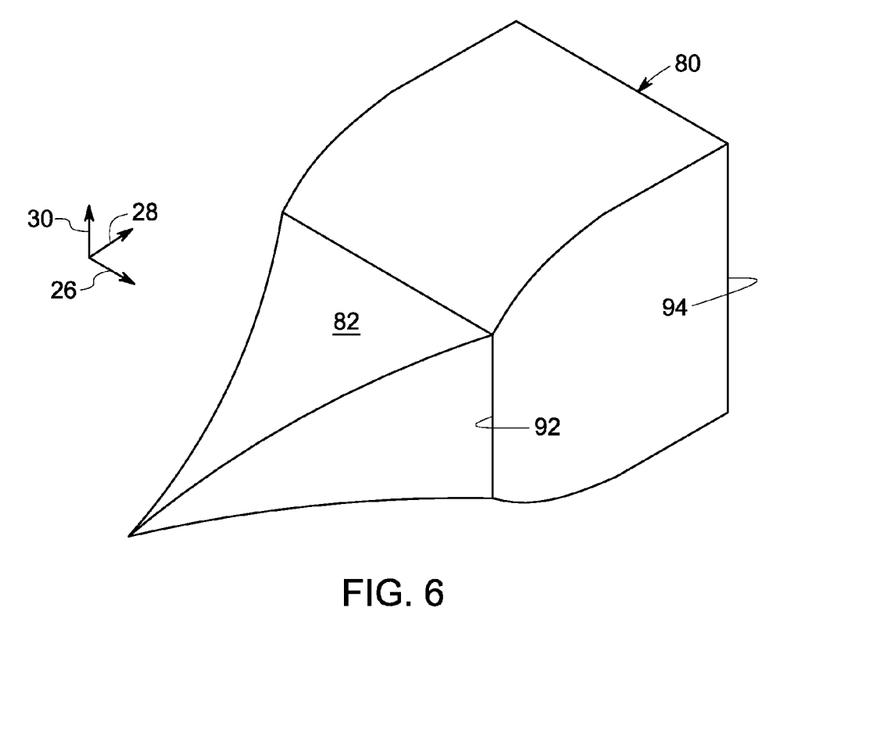
FIG. 6 is a perspective view of a multilayer optic device having a filtering region disposed on an input face of the optic device, where the filtering region is configured to selectively filter selected X-ray energy levels.
Figure 7:
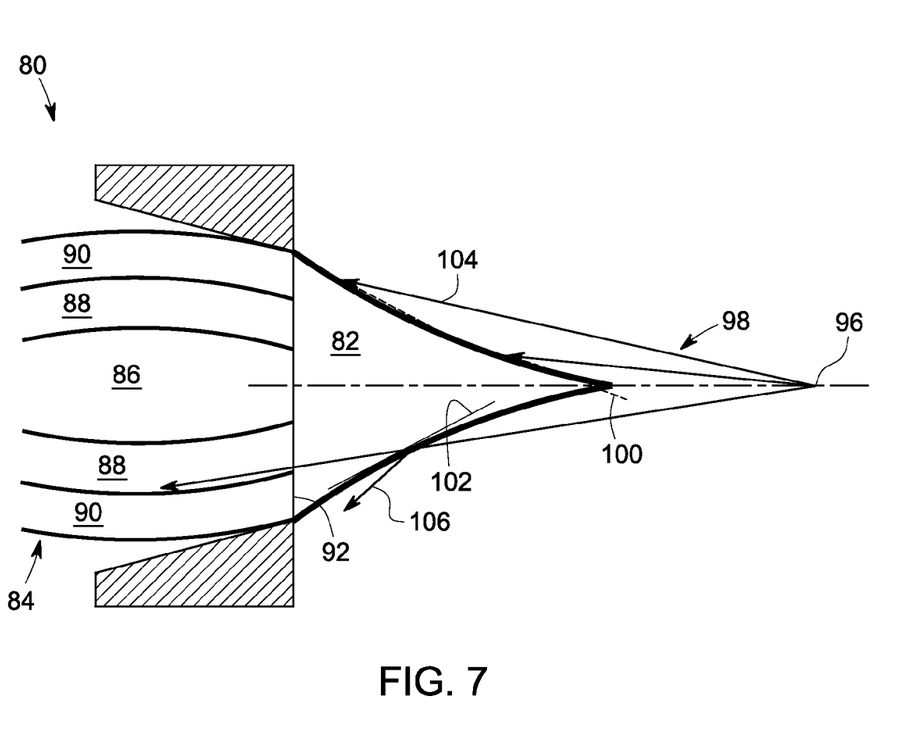
FIG. 7 is a cross-sectional view of the multilayer optic device of FIG. 6.

FIGS. 6-7 illustrate a multilayer optic device 80 having a filtering region 82. The filtering region 82 enables selective filtration of determined X-ray energy levels. In the illustrated embodiment, the filtering region 82 may filter out low energy X-rays 98.

The optic device 80 may comprise a multilayer stack 84. The multilayer optic device 80 includes a high-index core 86, grading zones 88, and low-index layers 90. In the illustrated embodiment, the filtering region 82, disposed adjacent to the input face 92 of the optic device 80, is pointed and spatially limited, making the electric potential higher than any surrounding support structure. The optic device 80 further includes an output face 94.

In the illustrated embodiment, the source 96 emits X-rays 98 that are directed towards the optic device 80. The filtering region may be concave in a direction of the X-rays 98. The filtering region may be made of a material having lower refractive index than the medium through which the X rays travel after leaving the source 96. The slopes 104 of lines 100 and 102, which are tangent to the surface of the filtering region 82, may be selected so as to cause total internal reflection of incident X-rays of specific energies, preventing these X rays from entering the optic device 80. In this manner, the output X-ray spectrum of the optic device 80 may be tailored. The curvature of the surface of filtering region 82 is such that that the angle between the tangent line 100 and 102 to the surface and the orientation of the incident X ray 98 is constant, wherein the angle facilitates total internal reflection of low-energy X-ray beams. The low-energy X rays 106 reflected by the surfaces of the filtering region 82 may be absorbed using low-energy X-ray absorbers. The surfaces of filtering region 82 may be made of a single layer or multilayers to provide sufficient reflection of low-energy X-ray beams 106. The slopes 104 of the lines 100 and 102, which are tangent to the surface of the filtering region 82, may have determined angles relative to incident X-ray beams 98. The slopes 104 of the tangent lines 100 and 102 may be designed such that the angle between these lines and the incident X-rays 98 may be kept constant. By keeping constant the angle between the slope 104 of the lines 100 and 102 relative to the incident X-ray beams 98, reflections of X-rays with a determined energy level may be ensured. In one embodiment, the slopes 104 of lines 100 and 102 may have the same angle relative to the incident X ray 98 to enable X-rays of particular energy levels to be filtered out before the rest of the X-ray beam enters the optic device 80.

Figure 8:
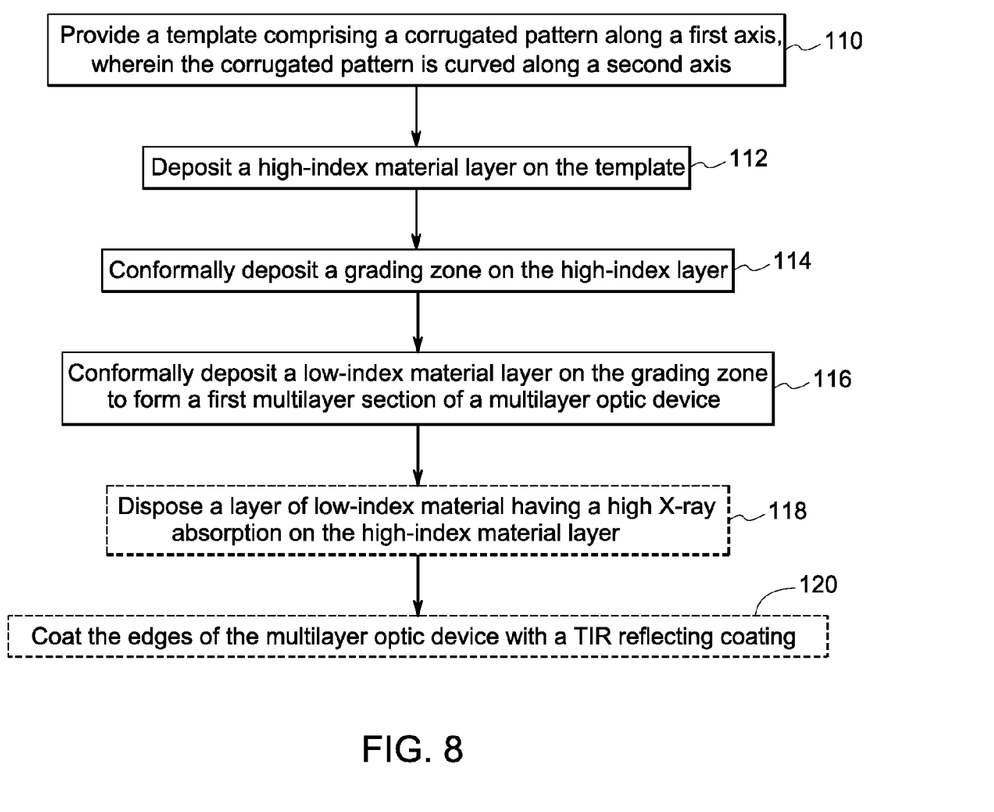
FIG. 8 is a flow chart of a method of making a multilayer optic device of FIGS. 1-4.

FIG. 8 illustrates a flow chart for a method of making the multilayer optic device. At step 110, a template having a corrugated pattern along a first direction is provided. The corrugated patterns in the template may be curved along the fan direction. The template may be made of any suitable materials, such as but not limited to, a ceramic, polymer, metal, cermet, composite materials, or combinations thereof. The dimensions of the corrugations correspond to corrugations desirable in the layers of the optic device.

At step 112, a high-index layer is conformally deposited on the template. Details for deposition of the layers of the multilayer optic device are provided in U.S. patent application Ser. No. 11/869,337. At step 114, a grading zone is conformally deposited on the high-index layer. At step 116, a low-index layer of material is conformally deposited on the grading zone to form a first multilayer section of a multilayer optic device. Although only a single multi-layer section is mentioned in reference to the steps identified in the flow chart in FIG. 8, any number of multi-layer sections may be fabricated and disposed adjacent to one another to form the multilayer optic device. Steps 112-116 may be repeated based on the number of multilayer sections desirable in the multilayer optic device. In one embodiment, the template may be made of the material of the high-index material layer. In this embodiment, the template may form part of the multilayer optic device and serve as a high-index material later. In this embodiment, the method may begin by depositing a grading zone (step 114) on the template (high-index material layer).

Optionally, at step 118, a layer of low-index material having a high X-ray absorption may be disposed on the high-index layer. The low-index material layer may be used to reduce the X-rays leaking out of the multilayer optic device at least from the side of the high-index material layer. Optionally, at step 120, the edges of the multilayer optic device may be coated with a TIR reflecting coating. For example, the fan edges of the multilayer optic device may be coated with a TIR reflecting coating. In one example, the TIR reflecting coating may include lead.

Figure 9:
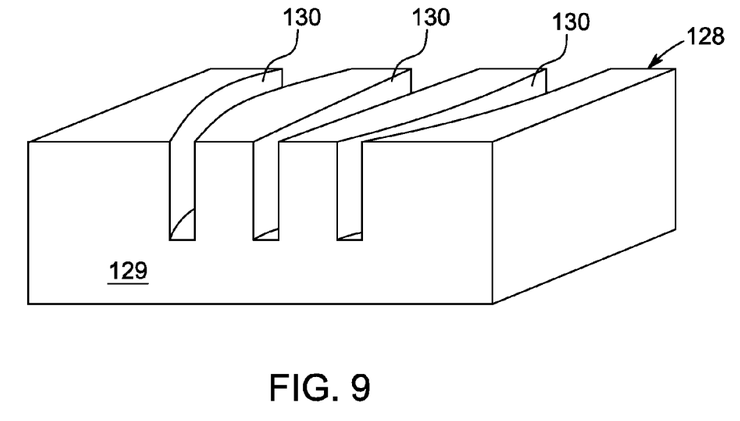
FIG. 9 is a perspective view of an example of a template used in the method of FIG. 8.

FIG. 9 illustrates an example of a template 128 that may be used in the method of FIG. 8. The template includes a base 129 and curved corrugations 130. The corrugations 130 may be representative of corrugations that are to be formed in the multilayers of the optic device. The template 128 may be made of a polymer, a ceramic, a metal, a polymer, or combinations thereof. In one embodiment, the template 128 may be made of a sacrificial material. In this embodiment, after the formation of the multilayer section, the sacrificial material may be decoupled from the multilayer section by disintegrating the template. The template may be disintegrated using techniques, such as but not limited to, etching or laser ablating. In another embodiment, the template 128 may be a reusable template. In this embodiment, the template 128 may be used to deposit the first and second multilayer sections. The first multilayer section may be decoupled from the template 128 before depositing the second multilayer section.

Figure 10:
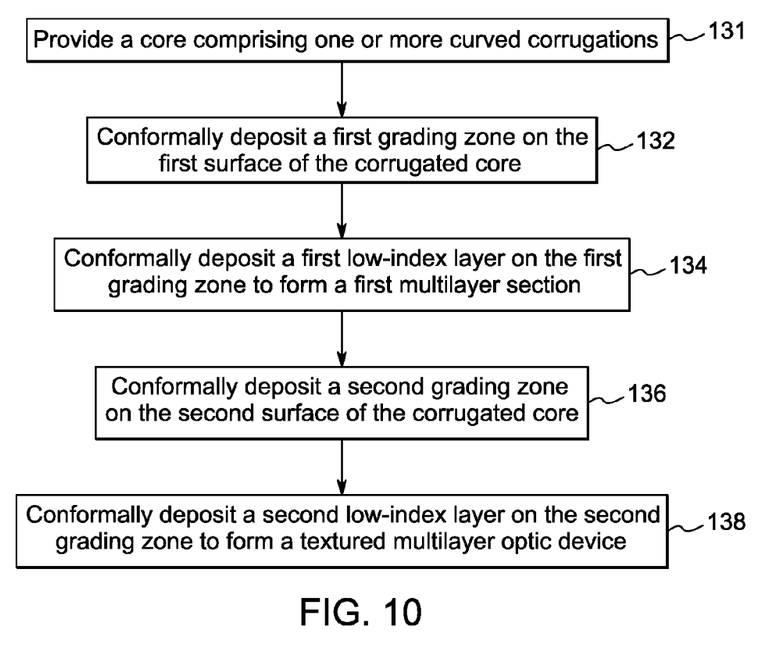
FIG. 10 is a method of making a multilayer optic device using a core as a template.

FIG. 10 illustrates a method of making the multilayer optic device. In the illustrated embodiment, the core may be used as the template. At step 131, a core having corrugations that are curved in a fan beam direction is provided. The core includes first and second surfaces. The core may be formed of a higher refractive index material such as beryllium, lithium hydride, magnesium, or any other suitable elements or compounds having similarly higher refractive indices and high X-ray transmission properties. The core may be less than a micrometer to greater than one centimeter in diameter. In an alternate embodiment, a layer formed of a core material suitable for transmitting X rays may be provided. Next, curved corrugations may be formed on portions of the first and second surfaces of the core layer. The corrugations may be formed by photolithography and etching, which provides channels on a small enough scale to minimally affect image resolution.

Individual layers of the optic device may be conformally formed on the patterned core. At step 132, layers of a multilayer zone may be conformally deposited on the core to form a first multilayer zone on the core. At step 134, subsequent layers, such as the low-index material layer may be deposited on the first multilayer zone to form the first multilayer section. At step 136, the partially formed multilayer optic can be turned over and the layers of the second grading zone may be deposited on the second surface of the core. At step 138, the second low-index layer may be deposited on the second grading zone to form the multilayer optic device.

Figure 11:
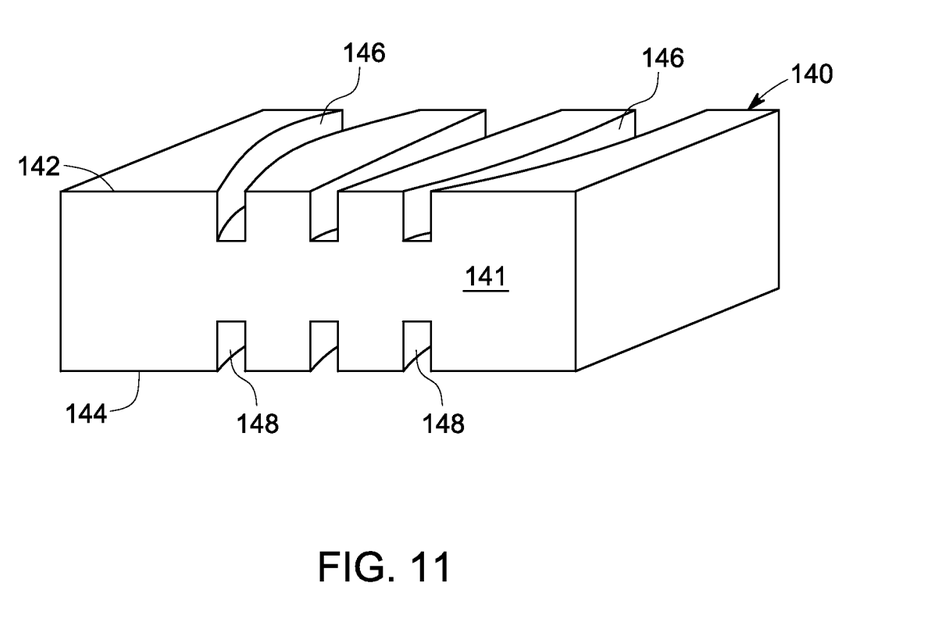
FIG. 11 is a perspective view of an example of a core that is used as a template in the method of FIG. 10.

FIG. 11 illustrates a core 140 having a base 141 and two opposite surface 142 and 144. Corrugations 146 and 148 are formed in the surfaces 142 and 144, respectively. The pattern of corrugations 146 and 148 may be same or different. The corrugations 146 and 148 may be continuous or discrete.

Figure 12:
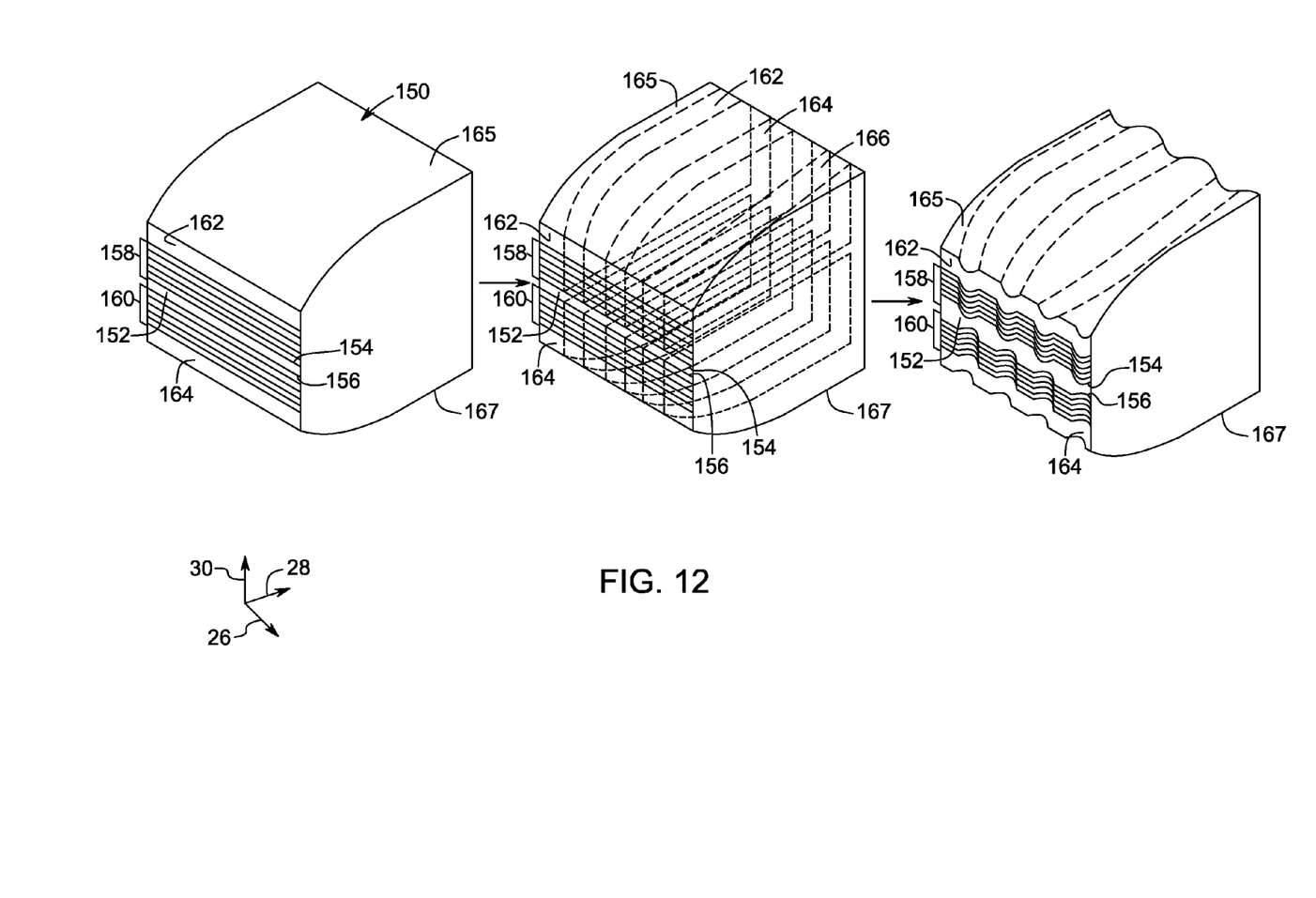
FIG. 12 is a pictorial view of a method of making a multilayer optic device from an existing multilayer optic device.

FIG. 12 provides a method of making a multilayer optic device like the one illustrated in FIG. 5. The method enables modifying an existing multilayer optic device into a corrugated multilayer optic device. The method begins by providing a multilayer optic device 150. The multilayer optic device 150 includes a core 152 having two opposite surfaces 154 and 156. Multilayer zones 158 and 160 are disposed on the surfaces 154 and 156, respectively. Low refractive index layers 162 and 164 are disposed on the multilayer zones 158 and 160, respectively.

Portions of the optic device where it is desirable to have corrugations to redirect the X-rays in the fan-beam direction may be removed to form corrugations. For example, the portions of the optic device closer to the two edges in the fan-beam direction may be etched out to form corrugations. As illustrated, one or more portions of the multilayer optic device 150 may be etched out. Also, the etched portions may be on either sides of the outer surfaces 154 and 156 of the core 152. The body of the core may not have any etched portions; accordingly, the body of the core may not have corrugations within it. In one embodiment, one third of the depth from the outer surfaces 165 and 167 of the optic device 150 may be removed. In another embodiment, from the outer surface 165 to the surface 154 of the core may be removed, and from the outer surface 167 to the surface 156 of the core may be removed.

In the illustrated embodiment, the multilayer optic device 150 may be etched in portions 162, 164 and 166 disposed between the surfaces 165 and 167 of the optic device 150. The surfaces 154 and 156 may or may not be etched. The etching may be done to provide curved regions in the etched layers. Next, a high or a low refractive index material, or graded region, may be deposited in the etched out regions. The material may include materials used to fabricate the original optic device 150. The material may be deposited using vapor deposition techniques, such as but not limited to, chemical vapor deposition and physical vapor deposition.

In one example, the device 150 may be etched on one side of the core 152, and the material of the corrugation may be deposited in the etched portions before etching on the other side of the core 152.

Advantageously, the invention enables a substantial increase in the X-ray flux intensity in a fan-beam direction for a fan-shaped X-ray beam. The fan-shaped beam may be employed in medical CT imaging and X-ray diffraction explosives detection.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. For example, although only two grading zones are shown in FIGS. 1, 3, 5, 7, and 12, the scope of the invention covers any number of such zones that are necessary to provide a specific optic device design for a particular application. Such other examples are intended to be within the scope of the claims if they have structural elements that do not differ from the literal language of the claims, or if they include equivalent structural elements with insubstantial differences from the literal languages of the claims.

What is claimed is:

1. A multilayer optic device having an input face and an output face, the optic device comprising:
    a high-index material layer having a first real refractive index $1-\delta_1$ and a first absorption coefficient $\beta_1$;
    a low-index material layer having a second real refractive index $1-\delta_2$ and a second absorption coefficient $\beta_2$; and
    a grading zone disposed between the high-index material layer and the low-index material layer, the grading zone comprising a grading layer having a third real refractive index $1-\delta_3$ and a third absorption coefficient $\beta_3$, such that $1-\delta_1>1-\delta_3>1-\delta_2$,
    wherein at least a portion of one or more of the high-index material layer, the grading zone and the low-index layer comprise one or more corrugations along a first direction, and wherein at least a portion of one or more of the high-index material layer, the grading zone and the low-index layer comprises one or more non-corrugation portions along a first direction.

2. The multilayer optic device of claim 1, wherein at least one corrugation is curved along a second direction.

3. The multilayer optic device of claim 2, wherein the second direction is about perpendicular to the first direction.

4. The multilayer optic device of claim 2, wherein the second direction is a fan beam direction.

5. The multilayer optic device of claim 2, wherein the corrugations are curved outwardly in the second direction with respect to a central axis of the optic device.

6. The multilayer optic device of claim 1, wherein the high-index layer, the grading zone and the low-index layer are conformally disposed.

7. The multilayer optic device of claim 1, comprising two or more multilayer sections, each multilayer section having a high-index material layer, a low-index material layer and a grading zone disposed between the high-index layer and the low-index layer, wherein the high-index layers of the multilayer sections are disposed adjacent each other to form a core.

8. The multilayer optic device of claim 1, comprising two or more multilayer sections, wherein the two multilayer sections have a common high-index layer.

9. The multilayer optic device of claim 1, wherein at least a portion of the high-index material layer comprises a core, and wherein the grading zone is disposed on at least a portion of the high-index material layer, and the low-index material layer is disposed on at least a portion of the grading zone.

10. The multilayer optic device of claim 9, comprising a first grading zone conformally disposed on a first surface of the core, and a second grading zone conformally disposed on a second surface of the core.

11. The multilayer optic device of claim 1, wherein at least one of the layers of the multilayer optic device comprises continuous corrugations in the first direction.

12. The multilayer optic device of claim 1, wherein the one or more corrugations comprise a relatively higher refractive index material compared to a material of the non-corrugation portion.

13. The multilayer optic device of claim 1, wherein the one or more corrugations comprise corrugation comprises a relatively lower refractive index material compared to a material of the non-corrugation portion.

14. The multilayer optic device of claim 1, further comprising a filtering region disposed on the input face of the optic device, wherein the filtering region is configured to filter out X ray beams of determined energy levels from X-ray beams incident on the multilayer optic device.

15. The multilayer optic device of claim 14, wherein the filtering region comprises a pointed conical structure.

16. The multilayer optic device of claim 14, wherein an exterior surface of the filtering region comprises a multilayer stack.

17. The multilayer optic device of claim 16, wherein the multilayer stack comprises alternating layers of high- and low-refractive index materials.

18. The multilayer optic device of claim 16, wherein the multilayer stack comprises a low-index layer, a high-index layer and a grading zone disposed between the high- and low-index layers.

19. A method of making an optic device, comprising:
providing a first multilayer section having a high-index layer, a grading zone and a low-index layer conformally disposed, wherein the high-index layer, the grading zone and the low-index layer comprise one or more corrugations along a first axis, and wherein at least one corrugation is curved along a second axis;
providing a second multilayer section having a high-index layer, a grading zone and a low-index layer conformally disposed, wherein the high-index layer, the grading zone and the low-index layer comprise one or more corrugations along the first axis, and wherein at least one corrugation is curved along the second axis; and
disposing the first multilayer section on the second multilayer section such that the high-index layer of the first multilayer section and the high-index layer of the second multilayer section are disposed adjacent each other.

20. The method of claim 19, wherein providing the first and second multilayer sections, comprises:
providing a first template and a second template, wherein the first and second templates comprise one or more grooves corresponding to the corrugations in the first and second multilayer sections; and
conformally depositing one or more multilayers of the first and second multilayer sections on the first and second templates, respectively.

21. The method of claim 20, comprising:
providing a high-index material layer having a first surface and a second surface, wherein the first and second surfaces comprise the one or more grooves corresponding to the corrugations in the multilayers of the first and second multilayer sections;
conformally depositing grading zones on the first and second surfaces of the high-index material layer; and
conformally depositing low-index material layers on corresponding grading zones.

22. A method of making an optic device, comprising:
providing a multilayer optic device comprising multilayers, comprising:
a high-index material layer having a first real refractive index $1-\delta_1$ and a first absorption coefficient $\beta_1$;
a low-index material layer having a second real refractive index $1-\delta_2$ and a second absorption coefficient $\beta_2$;
a grading zone disposed between the high-index material layer and the low-index material layer, the grading zone comprising a grading layer having a third real refractive index $1-\delta_3$ and a third absorption coefficient $\beta_3$, such that $1-\delta_1 > 1-\delta_3 > 1-\delta_2$, wherein at least a portion of one or more of the high-index material layer, the grading zone and the low-index layer comprises one or more corrugations along a first direction;
removing at least a portion of the low-index layer, and at least a portion of the grading zone along a plane to form grooves in the multilayers of the multilayer optic device; and
depositing a material in the grooves to form the corrugations.

23. The method of claim 22, further comprising removing at least a portion of opposite surfaces of the high-index material layer.

* * * * *